Aug. 23, 1955 L. KATZ 2,716,217

COMMUNICATION SYSTEM

Filed July 29, 1950 5 Sheets-Sheet 1

INVENTOR
LEONHARD KATZ

Elmer J. Gorn
ATTORNEY

DIFFERENTIATING AND CLIPPING CIRCUIT.

INVENTOR
LEONHARD KATZ
BY Elmer J. Gorn
ATTORNEY

INVENTOR
LEONHARD KATZ
BY Elmer J. Gorn
ATTORNEY

INVENTOR
LEONHARD KATZ
BY
Elmer J. Gorn
ATTORNEY

INVENTOR
LEONHARD KATZ
BY Elmer J. Gorn
ATTORNEY 2,716,217

COMMUNICATION SYSTEM

Leonhard Katz, Woburn, Mass., assignor to Raytheon Manufacturing Company, Newton, Mass., a corporation of Delaware Application July 29, 1950, Serial No. 176,560

3 Claims. (Cl. 332—9)

This invention relates to telemetering systems and more particularly to methods and means for increasing the amount of information which may be conveyed in a given time over a pulse position modulated radio system.

A pulse-position-modulated radio system is defined herein as a system in which intelligence is conveyed as a function of time elapsing between a fixed reference point in a time interval of predetermined duration, known as a channel, and the occurrence of an intelligence conveying pulse.

While not limited thereby, such systems are particularly useful and have wide application for experimental purposes in airborne vehicles where, due to such factors as weight, space and operational hazards, desired data must be obtained remotely. Due to the importance of conservation of space and weight in such applications, multichannel telemetering systems are generally used.

A multichannel telemetering system is herein defined as a system in which, during each of selected time intervals of predetermined duration, known as frames, a selected number of channels, as that term has been defined above, is sequentially transmitted.

To accomplish this, the separate channels are made to transmit sequentially over a single radio link by a time division multiplexing or switching system. There are practical limitations, however, as to the number of channels which may be used in such a system. Some variables on which information is desired may inherently change relatively slowly or uniformly with time, for example, the pull of gravity along a path perpendicular to the earth. In such case, systems having many channels may be used since the relatively infrequent transmitted samplings in the necessary time-sharing plan of a many channel system still may provide sufficient information for a given purpose. On the other hand, a rapidly varying or irregularly varying variable would require more frequent samplings and therefore would limit the system to a smaller number of channels. In mixed situations, where some variables must be sampled at a high rate and some need only a slow rate of samplings, the overall number of channels is generally reduced to and governed by the variable needing the highest rate of samplings.

In addition to the above limitations on the number of channels, practical circuit factors have heretofore limited the number of channels generally to approximately 36 or less in a single system.

Pursuant to the present invention, the effective number of channels of a conventional pulse position telemetering system may be increased, despite the above-mentioned limitations, without changing the time-sharing plan of the original system. This is accomplished generally by producing size variation in the pulse position pulses to give further information. In one embodiment of the present invention this is done by varying the amplitude of the pulse position pulses in accordance with additional information being transmitted. In conventional pulse position radio systems, it is the leading edge of the information pulse of each channel that is varied with respect to the fixed time base to give the channel information desired while the amplitude and width of the information pulses are maintained substantially constant. The leading edge of each pulse is the information conveying portion of each pulse position pulse. To insure that the relative positions of the leading edges of the pulse position information pulses are not disturbed, the amplitude of the pulses in a whole frame is maintained substantially constant. Individual samplings occur once for each frame.

Such an arrangement is particularly adaptable to mixed speed situations where some variables must be sampled at a high rate and some variables may be sampled at a slower rate. The rapidly changing samplings are segregated for sequential transmission in the conventional manner, while the more slowly changing variables are segregated and confined to the amplitude modulated channels which have a switching frequency of once each frame and are superimposed on the conventional pulse position system.

The present invention accomplishes the above by the use of two sets of channels. One set, herein termed pulse position channels, is made to operate in the conventional manner to produce pulse position information. The second set of channels, herein termed amplitude modulation channels, is used for obtaining additional information and varying the effective amplitude of the pulse position pulses in accordance with the additional information. The amplitude modulation channels or second set are synchronized with the pulse position channels so that only a single amplitude modulation channel is varying the effective amplitude of pulse position pulses during any given frame. This may be done by providing a multiplexing or switching arrangement for the amplitude modulation channels which are adapted to be triggered by channel synchronizing pulses of the pulse position channels. At the receiving end of the telemetering system, a set of channels corresponding to the channels mentioned above for varying the effective pulse amplitude, and herein termed amplitude modulation receiving channels, may be again synchronized with the channeling sequence at the transmitting end for segregating the information of the various channels. By using peak reading voltmeters in the various amplitude modulation receiving channels, the amplitude variations in the pulses may be obtained, which, with proper calibration, may be used to reproduce the original information. These amplitude variations may be recorded in synchronism with the conventional pulse position information recordings for ready reference.

In a second embodiment of the invention, the width instead of the amplitude of the pulses is varied in accordance with additional information obtained in the second set of channels, herein termed width modulation channels. Width variation of the pulses may be obtained by monostable multivibrator circuits in the width modulation channels and arranged to have their periods controlled in accordance with the information obtained in the particular channel. One such arrangement is to use a strain gauge bridge to produce a voltage signal having a magnitude determined by the desired information and coupling this voltage signal to the multivibrator to control its period. By using the pulse position pulses to trigger the multivibrator, it will have an output pulse picture having its leading edge corresponding to the leading edge of the pulse position pulse and a duration determined by the voltage signal from the strain gauge.

At the receiver, a channel switching arrangement similar to that used in the first embodiment may be used. High inertia voltmeters in the respective channels may be used to indicate the variations in width of the pulses.

By proper calibration of the voltmeters, they may be used to obtain the original transmitted information.

These and other features, objects, and advantages will become more apparent from the following description taken in connection with the accompanying drawings, wherein.

Figure 1:
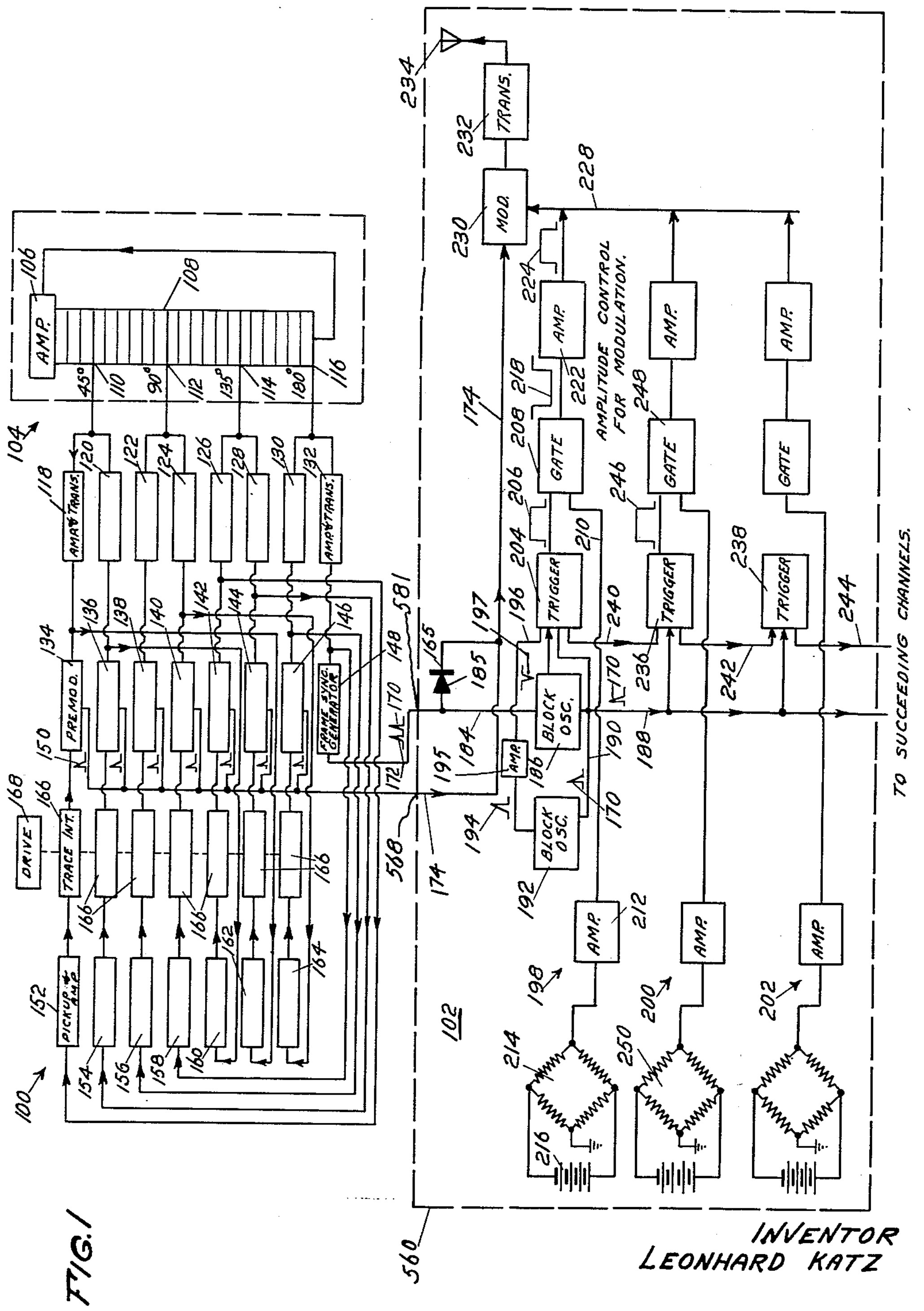
Fig. 1 is a partially schematic and partially block diagram of a transmitting system assembled in accordance with one embodiment of the present invention.

Referring now in more detail to the illustrative first embodiment of the invention with particular reference to Fig. 1, the transmitting system has two sets of channels. One set of channels, designated generally by the numeral 100, is for producing pulse position information. The other set of channels, some channels of which are shown in Fig. 1 and designated generally by the numeral 102, is for obtaining additional information and varying the effective amplitudes of the pulse position pulses of the pulse position channels 100. This variation in amplitude is in accordance with the additional information obtained in the second set of channels and will be hereinafter more fully explained.

The pulse position information producing channels 100 may operate in accordance with known telemetering pulse position techniques. While not limited thereto, the channels 100 may be assembled to operate as disclosed and claimed in application of Vernon C. Wescott et al. concerning Telemetering Transmission Systems, Serial No. 31,096, hereinafter briefly described, for more clearly showing the operation of the invention. A means shown generally by the numeral 104, for generating oscillations under relatively low frequency, 1390 cycles per second, hereinafter referred to as the frame frequency, may consist of a delay line oscillator including an amplifier 106 in which a positive feedback may be achieved through a delay line 108.

Where, as in the system under consideration, it is desired to provide eight channels 100 during each frame, the delay line 108 may be tapped at four points 110, 112, 114 and 116 corresponding, respectively, to phases of 45°, 90°, 135°, and 180°. Four additional phases, corresponding, respectively, to 225°, 270°, 315°, and 360° or zero, may also be obtained as follows. The 45° signal is applied to a pair of amplifiers and transformers generally designated by the reference characters 118 and 120. The output from the former is taken in such a manner that the input thereto remains uninverted and the output from the latter is taken in such a manner that the input thereto is inverted. There are thus obtained two signals 180° out of phase with respect to each other corresponding, respectively, to 45° to 225°.

In a similar manner, the 90°, 135° and 180° signals are applied, respectively, to pairs of amplifiers and transformers designated by reference characters 122 and 124, 126 and 128, and 130 and 132. Each pair of amplifiers and transformers provides two signals 180° out of phase with respect to each other. The signals from the first of these pairs of amplifiers and transformers produce signals corresponding to 90° and 270°, the second, 135° and 315°, and the third, 180° and 360°. The combined result is the production from a single source, namely, the delay line oscillator 104, of eight channel signals successively different in phase by 45°.

The outputs of the amplifiers and transformers 118 to 130, inclusive, are applied, respectively, to what may be termed premodulators, generally designated by reference characters 134, 136, 138, 140, 142, 144 and 146, to derive therefrom seven sharp pulses 150 by means of the position of each of which in its channel the desired information may be transmitted. The output of the amplifier and transformer 132 is applied to what may be termed a frame sync signal generator, generally designated by the reference character 148, to derive therefrom a characteristic signal corresponding preferably to 360° or zero phase by means of which both the receiving system shown in Fig. 2 used in conjunction with the transmitting system of Fig. 1, and the amplitude modulation channels 102 of the transmitting system shown in Fig. 1, may be synchronized.

For the purpose of controlling the position of pulses 150 in their respective channels, information pick-up devices and amplifiers, generally designated by the reference characters 152, 154, 156, 158, 160, 162 and 164, which may be in the form of conventional alternating current operated strain gauges mounted in bridge circuits, are supplied, respectively, with power from the transformers and amplifiers 126, 128, 130, 132, 120, 118 and 124 and modulate the corresponding premodulator in accordance with the strain gauge information. It is to be noted that the outputs of these pick-up devices and amplifiers are applied through trace interrupting circuits 166 sequentially driven by a suitable driver mechanism 168 for the purpose of interrupting the trace of information at known intervals and thereby more easily identifying the signals from the various channels at the receiver shown in Fig. 2.

The frame sync generator 148 is not modulated as are the premodulator circuits. It is rather arranged to generate a characteristic frame sync signal at the beginning of each frame. Such characteristic signal may consist of two sharp pulses 170 and 172, the second of which, or 172, occurs preferably at the beginning of the frame sync channel. These pulses are separated by a predetermined time interval which makes them particularly adaptable for synchronizing the operation of a receiver as that shown in Fig. 2 with the transmitter shown in Fig. 1. A suitable time interval separation of these pulses is eight microseconds. In the present embodiment, one of the synchronizing pulses is also used to synchronize the operation of the amplitude modulator channels 102 with the pulse position channels 100.

With a frame frequency of 1390 cycles per second as determined by the oscillator 104, the length of the time interval between frame sync pulses 170 is about seven hundred and twenty microseconds which is the frame length. The eight channels 100 have thereby a switching rate of 11,120 per second (8×1390) so that, if desired, each channel can be of approximately ninety microseconds in duration. However, a channel with twenty microseconds has arbitrarily been chosen whereby, if desired, the system can accommodate up to a total of thirty-six channels.

Figure 9:
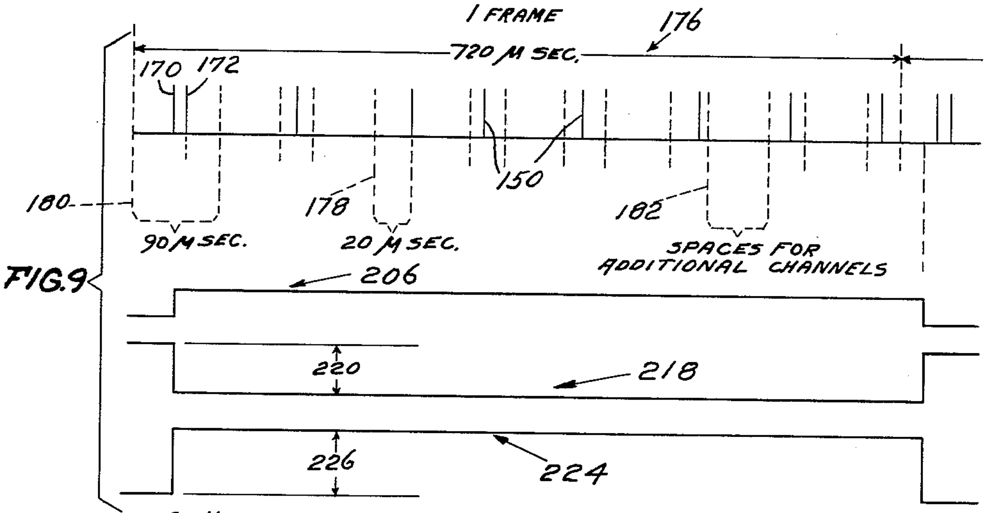
Fig. 9 is a pulse timing diagram for illustrating the operation of the invention.

The sequential operation of the premodulators 134 to 146 and the frame sync generator 148 will thereby produce in output line 174 a typical pulse time picture as shown in Fig. 9. In Fig. 9, each of the pulses 150 in a frame 176 of seven hundred and twenty microseconds' duration is produced by one of the premodulators 134 to 146 and, in the present embodiment, has a position within a twenty microsecond channel interval 178 determined by the information at the corresponding pick-up and amplifier circuit 152 to 164. For each successive frame 176 a particular channel or pulse position channels 100 will have a corresponding channel interval 178 and located in the same relative position with respect to the other channel intervals 178 corresponding with other channels 100. The two frame sync pulses 170 and 172 (Figs. 1 and 9) will appear at the beginning of each frame 176 in the same relative position in the ninety microsecond interval 180 allotted to the frame sync channel. Intervals 182 between the twenty microsecond channel intervals 178 may be used for additional channels, if desired.

Frame sync pulses 170 and 172 also appear through line 184, which is isolated from the pulses 150 in line 174 by a one way current valve 185, such as a crystal or diode, at a blocking oscillator 186 which has a time constant such that only the first frame sync pulse 170 of each frame 176 will appear in lines 188 and 190 leading from the blocking oscillator 186. The pulses 170 from succeeding frames 176 are led through line 190 to a second blocking oscillator 192. The time constant of the second blocking oscillator 192 is such that only one pulse 194 of a number of pulses 170 will appear in line 196 of the blocking oscillator 192. The number of pulses 170 which are blocked by the blocking oscillator 192 after pulse 194 is equal to one less than the number of channels used in the amplitude modulation channels 102. For example, if there are seven channels in the amplitude modulation channels 102, the blocking oscillator 192 is designed with a time constant to pass only the first of seven pulses 170 and to block the other six. In the present embodiment, seven channels are preferably used in the set of amplitude modulation channels 102, although other numbers of channels may also be used. For purposes of illustration, only three of these seven channels are shown in Fig. 1 and designated by the numerals 198, 200 and 202.

The pulse 194, after inversion by a suitable amplifier 195, appears as negative pulse 197 through line 196 at a trigger and monostable gating multivibrator or oscillator circuit 204 in channel 198 thereby triggering the circuit 204 from an "off" to an "on" position, that is, causing the circuit 204 to produce a positive gating pulse 206 at a gate 208. By a monostable multivibrator is meant an oscillator which is stably quiescent in the absence of a triggering pulse and which, when triggered, goes through a single cycle of oscillation and returns to its initial stable condition and remains there until again triggered. The gating pulse 206 has a duration and time position such as to encompass the pulses 150 occurring in one entire frame 176 (Fig. 9). A typical time position picture of pulse 206 may be seen in Fig. 9 where the pulse 206 starts at the sync pulse 170 and ends preferably at a point beyond the last pulse position pulse 150. The pulse 206 thereby opens gate 208 to a voltage signal in line 210 from an amplifier 212 and suitable intelligence pick-up circuit 214, such as a strain gauge resistance bridge connected across a suitable potential source, such as a battery 216. The voltage signal in line 210 will appear during pulse 206 through gate 208 as a negative pulse 218 starting and ending at the same time as pulse 206 and having a substantially constant negative amplitude 220 (Fig. 9) determined by the amplitude of the voltage signal in line 210 which, as heretofore explained, preferably varies relatively slowly with time. The pulse 218 is amplified to a suitable level and inverted by an amplifier 222 and appears as a positive pulse 224 having an amplitude 226 (Fig. 9) indicative of the ampltude of the voltage signal in line 210. The pulse 224 is applied through line 228 at a modulator 230 to produce a bias in a manner to control the effective modulating amplitude of the pulses 150 of a corresponding frame 176 appearing through line 174 at the modulator 230 and thereby causing a transmitter 232 and antenna 234 to radiate high frequency radio energy having both pulse position and pulse amplitude information.

Figure 3:
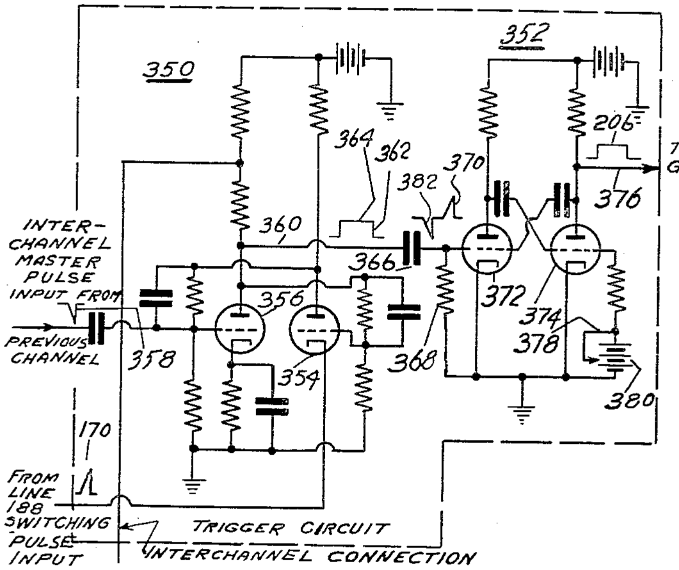
Fig. 3 is a circuit diagram of a suitable trigger circuit for multiplexing or switching between channels in the invention.

All of the other channels of the amplitude modulation channels 102 are also provided with trigger circuits similar to the trigger circuit 204 in channel 198. Thus, trigger circuits 236 and 238, similar to trigger circuit 204, are provided in channels 200 and 202, respectively. The trigger circuits 204, 236 and 238 have interchannel connections 240, 242 and 244 for interchannel triggering pulses as will be hereinafter described. Also, line 188 from the blocking oscillator 186 is connected to each of the trigger circuits 204, 236 and 238 so that a pulse 170 for each frame 176 will appear at each of the trigger circuits. The operation of these trigger circuits, which will be described in more detail with reference to Fig. 3, is such that with the above arrangement each time a pulse 170 appears in line 188, the trigger circuit which was in the "on" position is turned "off," thereby causing a pulse to appear in the interchannel connection to turn the succeeding trigger circuit in the "on" position. For example, the pulse 170 appearing in line 188 immediately after the pulse 197 will turn the trigger circuit 204 to the "off" position and thereby cause another pulse through interchannel connection 240 to turn the trigger circuit 236 to the "on" position. This will cause a gate opening pulse 246, similar to the pulse 206, to open gate 248, which may be similar to gate 208, and permit a voltage signal from a pick-up circuit 250, which may be similar to the pick-up circuit 214, to cause corresponding amplitude modulation at modulator 230 of pulses 150 occurring during this period. Similarly, on the next pulse 170 appearing in line 188, a trigger circuit 238 will be in the "on" position to convey information from channel 202. The remainder of the seven amplitude modulation channels (not shown) are constructed to operate in a manner similar to amplitude modulation channels 102 just explained.

No interchannel connection is provided between the last of the seven amplitude modulation channels and the first amplitude modulation channel 198. Therefore only the pulse 197 may trigger the trigger circuit 204 to the "on" position as explained above. Thus, for each complete frame of the pulse position channels 100, the information in one of the amplitude modulation channels 102 is superimposed on the pulses 150 and, for each successive frame, the information of a succeeding amplitude modulation channel of the channels 102 is used. In this manner, the information in each of the second set of channels 102 is sampled once during each seven frames of the first set of channels 100.

Figure 2:
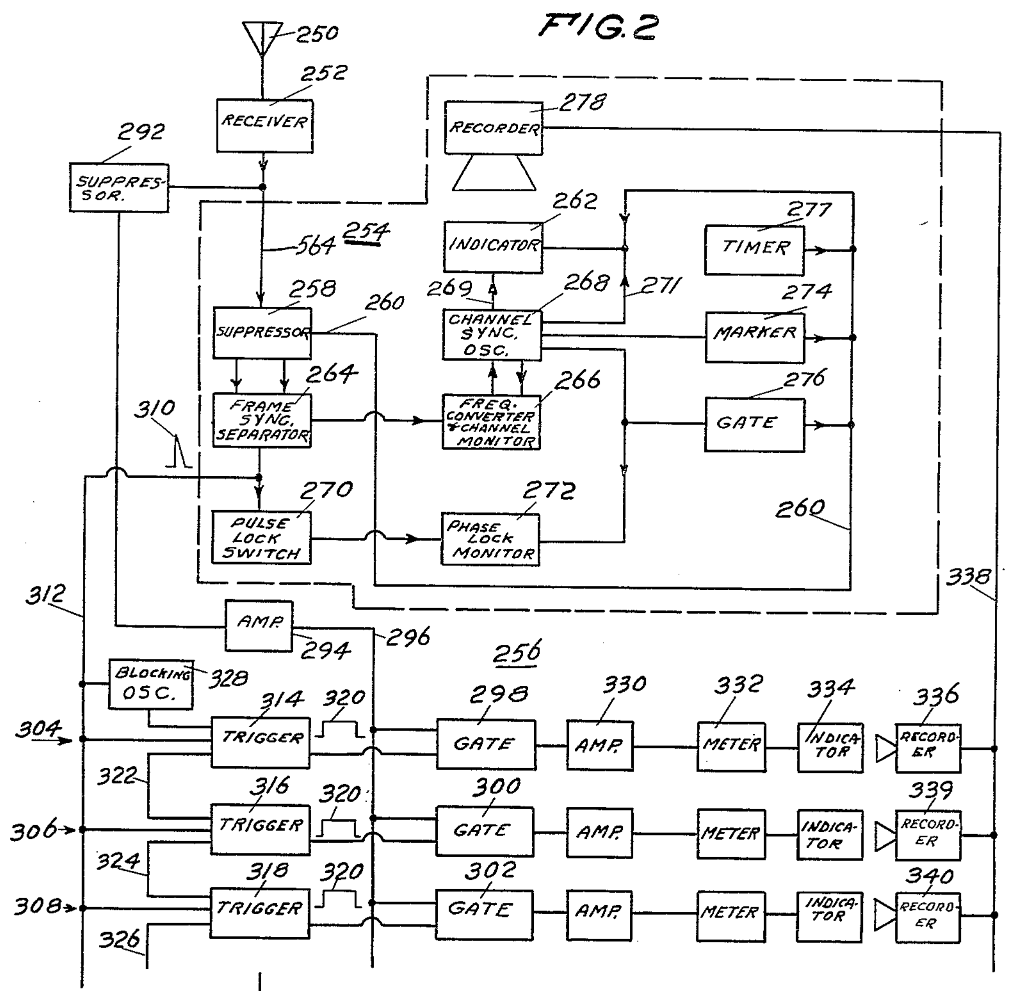
Fig. 2 is a block diagram of a receiving system for operation with the transmitting system in Fig. 1 in accordance with the present invention.

Now referring to the receiving equipment in Fig. 2, the amplitude modulated pulse position pulses transmitted from the transmitting equipment in Fig. 1 are received by antenna 250 and applied to any suitable pulse receiver 252. The pulse position information from the output of receiver 252 is obtained and recorded by the circuits 254 enclosed in dotted lines and herein termed pulse position circuits. The amplitude modulation information from receiver 252 is obtained and recorded by circuits 256, herein termed amplitude modulation circuits, and are comprised of the remainder of the circuits in Fig. 2.

While not limited thereto, the pulse position circuits 254 may be assembled to operate as disclosed and claimed in application of Vernon C. Wescott et al. concerning Telemetering Receiving Systems, Serial No. 35,816, and hereinafter briefly described for more clearly showing the operation of the present invention. For obtaining the pulse position information, the output of receiver 252, which generally includes considerable noise that would interfere with a clear reading of desired signals, is fed to a suppressor circuit 258. This noise is removed in the suppressor circuit 258 and the amplitudes of the pulses are clipped to a uniform height and trimmed to a suitable width for proper operation of succeeding circuits of the pulse position circuits 254. One of the outputs from the suppressor circuit is for application through line 260 to the intensity grid of oscilloscope indicator 262. Other outputs of the suppressor circuit 258 are fed to a frame sync separator 264 which utilizes the eight microsecond interval between frame sync pulses 170 and 172 originally transmitted, for producing local frame sync signal pulses at a 1390 per second frame frequency for synchronizing the receiving apparatus in Fig. 2 with the transmitting apparatus in Fig. 1. For this purpose the 1390 per second signal pulses from the frame sync separator 264 are fed to a frequency converter and channel monitor 266. In the frequency converter and channel monitor 266 signals of a suitable frequency are produced to synchronize oscillations of a free running local channel sync oscillator 268 for producing signals at the channel switching rate of 11,120 cycles per second. The channel sync oscillator also includes a feedback to the channel monitor portion of the frequency converter and channel monitor circuit 266 whereby the oscillating frequency of the channel sync oscillator may be maintained at a proper constant rate. The output pulses of the frame sync separator 264 are also fed through a pulse lock switch 270 to the sweep circuit of an oscilloscope in a phase lock monitoring circuit 272 to trigger said switch circuit for the generation of a horizontal sweep having a length of somewhat less than that of a single channel, for example, of about 15 microseconds. The phase lock monitor 272 is also fed by an output signal of the channel sync oscillator 268 which is supplied to the vertical deflecting plates of said oscilloscope thereby indicating on the oscilloscope screen any drift in phase of the signals of the channel sync oscillator 268. From this drift indication, corrections may be made to the channel sync oscillator 268 to obtain a properly phased output. Thus between the phase correcting monitor 272 and the channel monitor 266, proper synchronization of the channel sync oscillator 268 is assured.

Channel sync signal pulses from the channel sync oscillator 268 are fed through line 269 to trigger the sweep circuit of the oscilloscope in the indicator circuit 262, the sweep of said circuit being set somewhat longer than the channel width of 20 microseconds, for example, 21 microseconds. However, the oscilloscope beam is normally suppressed except, at the occurrence for extremely small instants of time, by signals, as will hereinafter be described, which intensity modulate said beam. One of these signals comes from the channel sync oscillator 268 through line 271 and modulates said beam at the commencement of the sweep, thereby producing a spot on the oscilloscope beam at a time corresponding to the commencement of said sweep. Another point at which the sweep in the oscilloscope of the indicator 262 is intensity modulated occurs 20 microseconds after the commencement of the indicating sweep and is produced by a signal pulse from a marker 274. The marker 274 may take the form of a conventional delay line to which is applied an output pulse of the channel sync oscillator 268. Another portion of the output pulse of the channel sync oscillator 268 is applied to a gating circuit 276 which, actually, is incorporated in the indicator 262, and which conditions the indicator to show the signals applied thereto only during the 20 microseconds of each channel.

During this 20 microsecond interval, the output of the suppressor circuit 258 in line 260 leading to the indicator 262 causes the intelligence conveying pulse position pulses 150 of each of channels 100 (Fig. 1) to be displayed on the indicator screen during successive sweeps. Finally, at regular intervals, for example, once per second, the indicator beam is intensified over a time interval covering a plurality of sweeps by a timer 277 to permit time synchronization of the permanent record to be made of the indicator display. This permanent record is made by a motion picture camera recorder 278 which faces the indicator screen in which the film is moved continuously.

Figure 11:
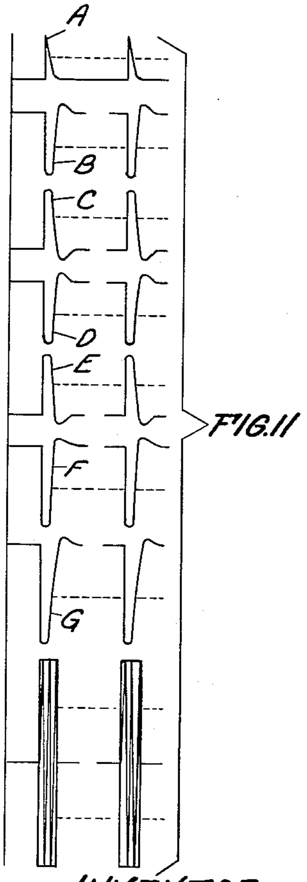
Fig. 11 is a diagram illustrating operation of the circuit in Fig. 5 in the first embodiment of the invention.

A typical appearance of the oscilloscope screen at a given instant is shown in Fig. 11. In the interest of simplicity, only three intelligence signals 280, 282 and 284 have been shown rather than the seven that are actually included in the system under consideration. At the extreme bottom, there is observed a spot labeled sync signal. This corresponds to the output of the channel sync oscillator 268 through line 271 and is the indication of the channel sync signals. At the extreme top, there is observed another spot labeled 20 microsecond mark. This corresponds to the output of the marker 274 under the control of the channel sync signals of the channel sync oscillator 268. Between the above two spots are the above-mentioned three pulse position intelligence spots, each corresponding to one of three channels from the transmitting system of Fig. 1 as obtained from the suppressor circuit 258. The spot numbered 282 is actually in the center of the channel indicating that the pick-up and amplifier in the corresponding channel in Fig. 1 is feeding only the unmodulated output of the premodulator in that channel. The spots labeled 280 and 284 are near the bottom and top ends, respectively, of their channels indicating that the pick-up and amplifier circuits in their respective channels are feeding modulated outputs to their respective premodulators. The former is an output of lesser amplitude than the normal unmodulated amplitude and the latter output of greater amplitude than the normal unmodulated amplitude. The position of the pulses 280, 282 and 284 at any given instance will vary in accordance with the modulation at the premodulators in the corresponding channels and, therefore, will vary in accordance with the information picked up at the pick-up and amplifier circuits in those channels.

Figure 10:
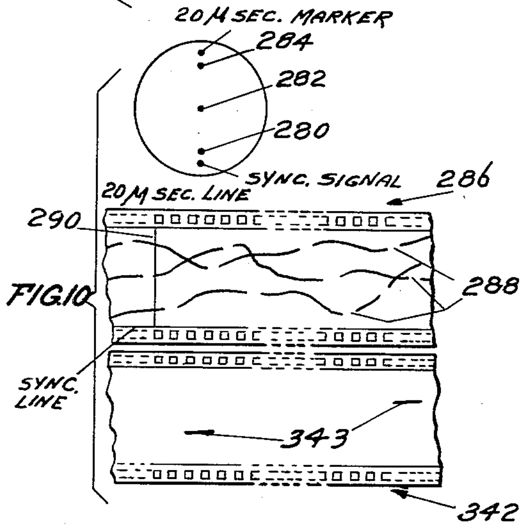
Fig. 10 is a fragmentary view of strips of film illustrating suitable recording of information in the receiving portion of the invention.

A motion picture film exposed and continuously moving during this time may have a typical appearance as shown by the film 286. The successive spots appearing on the indicator screen cause the moving film to acquire the continuous traces shown on the film 286. The operation of the trace interruptors 166, Fig. 1, causes gaps 288 to appear in the film traces. The timer 277 causes transverse lines 290 to appear periodically, as every second, upon the film (Fig. 10).

For obtaining the amplitude modulation information of the pulse position pulses, the output of the receiver 252 (Fig. 2) is also applied to a second suppressor circuit 292 where noise is removed from the amplitude modulated pulse position pulse signals. The amplitude modulated pulse position pulses are then amplified to a suitable level by an amplifier 294 and applied simultaneously through line 296 to gating circuits 298, 300 and 302 of channels 304, 306 and 308, respectively, in the amplitude modulation circuits 256.

Pulses 310 at the output of the frame sync separator 264 are also made to appear through line 312 at trigger circuits 314, 316 and 318 of the channels 304, 306 and 308, respectively. The trigger circuits 314, 316 and 318 may be similar to the trigger circuit 204 in Fig. 1 and may be timed to produce gating pulses 320 similar to the gating pulse 206 (Fig. 1) and of the same duration. The trigger circuits 314, 316 and 318 also have inter-channel connections 332, 324 and 326 between successive channels. While only three channels 304, 306 and 308 are shown in Fig. 2 for purposes of illustration, seven channels are preferably used, each corresponding to one of the channels of the amplitude modulation channels 102 (Fig. 1). Each of the remainder of the seven channels may be constructed and arranged similarly to each of the three channels shown in Fig. 2. A blocking oscillator 328, which may be similar to the blocking oscillator 192 (Fig. 1), has a time constant such that only each eighth pulse 310 will appear at the trigger circuit 314. When the pulse 310 appears at the trigger circuit 314, it triggers the circuit 314 to the "on" position starting the gating pulse 320. The pulse 310 appears at a time relation in each frame coincident with the second frame sync pulse 172, Fig. 1, and the gating pulse 320 has a duration as described with regard to the gating pulse 206 (Fig. 1). Therefore the gate 298 is open for admitting the amplitude modulated pulse position pulses of an entire frame to a suitable pulse amplifier 330. These pulses are amplified to a suitable level by amplifier 330 for application to a meter 332, such as a peak reading volt meter. The average peak amplitudes of these pulses are then indicated on a suitable indicator 334 of the volt meter 332. The indication on the indicator 334 is then continuously recorded by a camera recorder 336 which may be similar to the recorder 278, and preferably synchronized with the recorder 278 as by a mechanical linkage 338. The indicator 334 may be of the mirror galvanometer type which throws a pot of light on a screen, the spot of light having a deflection from a given reference determined by the amplitude of the voltage determined by the meter 332. Thus this spot of light may appear on the film of the recorder 336 as a line similar to the lines on the film 286, Fig. 10, from the recorder 278.

The pulse 310 appearing in line 312 immediately following the pulse which triggered the circuit 314 to the "on" position causes the circuit 314 to be turned to the "off" position and the next adjoining circuit 316 to be turned to the "on" position. Thereby the channel 306 will obtain the amplitude information from the succeeding frame of amplitude modulated pulse position pulses in a manner similar to that explained with regard to channel 304. This successive channel operation will occur for each pulse 310 for seven successive frames and on the eighth frame, channel 304 will again repeat the sequence. The recorders 336, 339 and 340 and the remaining four recorders (not shown) in the seven channels of the amplitude modulator circuits 256 will record amplitude modulation information similar to that described with regard to the recorder 336. The typical appearance of such recorded information is shown in Fig. 10 on the film 342 which, due to the synchronizing link 338, may be placed next to the film 286 from recorder 278 for advantageous use of the time and channel markers on film 286. Since a single channel will obtain amplitude modulation pulses once for each eight frames, that is, for a period of approximately 720 out of a time duration of 5,760 microseconds, the amplitude modulation information of channel 304 will appear on film 342, Fig. 10, as a series of relatively short lines 343 with the distance from the center line of the film 342 conveying the amplitude information. If desired a single film recorder may be properly placed to obtain all of the amplitude modulation information on a single film. The individual channel positions may be identified by comparison with the markings on film 286.

The general operation of the pulse position and the pulse amplitude transmitting and receiving equipment in the present embodiment having been described, a more detailed description and circuit diagrams of some of the individual circuits will now be undertaken.

A circuit diagram of a suitable trigger circuit, as circuit 204, for obtaining proper sequential operation of the amplitude modulation channels in the transmitter in Fig. 1 and the receiver in Fig. 2 is shown in Fig. 3 and consists essentially of two parts, namely, a sequencing circuit 350 and a monostable multivibrator circuit 352. In the sequencing circuit 350, both triodes 354 and 356 are arranged so as to be stable when either of them is conducting. Any pulse 170 in line 188 (Fig. 1) will stop conduction in triode 354 and put the sequencing circuit 350 in the "off" position if triode 354 happens to be conducting, thereby making the triode 356 conductive. Either a negative master pulse 358 from an interchannel connection, as line 240, Fig. 1, for the trigger circuit 236, or the negative pulse 197 in line 196 for the trigger circuit 204, will make the triode 356 nonconductive and the triode 354 conductive. Thus in the case of trigger circuit 204, when master pulse 197 occurs, triode 356 becomes nonconductive causing a rise in potential in line 360 from its anode as shown at 362 of pulse 364. This rise in potential, due to a differentiating circuit formed by capacitor 366 and grounded resistor 368, appears as a positive pulse 370 at the grid of triode 372 in the monostable multivibrator circuit 352. Triode 372 becomes conductive and triode 374, which has heretofore been conductive, becomes nonconductive, resulting in a positive output gating pulse 206 (Figs. 1 and 3) in line 376 leading to the gate 208 (Fig. 1). The duration of the positive pulse 206 is controlled by a bias at the grid of triode 374 by adjustment of an adjusting arm 378 at a potential source, such as a battery 380. Since the triode 356 will not become again conductive until the next switching pulse 170 makes the triode 354 nonconductive, the pulse 364 has a longer time duration than pulse 206 and therefore the negative pulse 382 at the grid of triode 372 resulting from the negative-going portion 384 of pulse 364 will not effect the duration of pulse 206. The pulse 364 could be used directly for operating the gate 208, but, since its duration may not be varied, except by varying the time interval between switching pulses 170, the addition of the monostable multivibrator 352 is preferred. The circuit in Fig. 3 may be used in each of the trigger circuits for operation as described with regard to Figs. 1 and 2.

Figure 4:
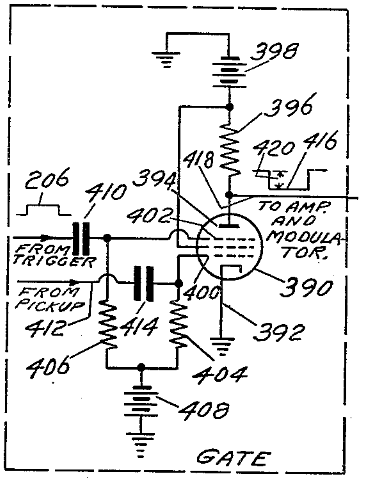
Fig. 4 is a circuit diagram of a suitable gate for use in the pulse varying channels of the invention.

A suitable gate circuit for use in the amplitude modulating channels in both Figs. 1 and 2 is shown in Fig. 4. The gate circuit may consist of a pentode 390 with its cathode 392 connected to ground and its anode 394 connected through a resistance 396 to the positive terminal of a potential source, such as a battery 398, having its negative terminal connected to ground. The positive terminal of battery 398 is also connected to a screen grid of a pentode 390. Control grid 400 and suppressor grid 402 of the pentode 390 are suitably biased by connecting them through resistances 404 and 406, respectively, to the negative terminal of a power source, such as a battery 408, whose positive terminal is connected to ground. A suitable bias for the suppressor grid 402 is such that it will normally prevent the pentode 390 from conducting, except when a gating pulse 206 from a circuit, such as shown in Fig. 3, appears through condenser 410 to raise the potential at suppressor grid 204. During the pulse 206 pentode 390 becomes conductive by an amount determined by the potential at grid 400. The potential at grid 400, besides having a normal reference bias from the negative terminal of battery 408, is further biased by the voltage signal from the unbalance of a resistance bridge, such as 214 (Fig. 1), caused in accordance with desired information and suitably amplified. The potential at the control grid 400 will therefore vary in accordance with received voltage information in line 412 and appearing through capacitor 414 at the grid 400. Therefore, the gating pentode 390 will produce a negative output pulse 416 in line 418 leading from its anode circuit 394 to a suitable amplifier, such as amplifier 222 (Fig. 1), to the modulator 230. The magnitude 420 of the negative pulse 416 is therefore determined by the information appearing through line 412 from a suitable pick-up circuit.

The pulse 416 appears simultaneously with the input gating pulse 206.

The same gating circuit shown in Fig. 4 may also be used in the amplitude modulation receiving channels shown in Fig. 2 and referred to by numerals 298, 300 and 302. In these receiving channels, however, instead of line 412 running to an information pick-up circuit, it runs to line 296. Therefore during a gating pulse 320 at suppressor grid 402, the amplitude modulated pulse position pulses appearing at grid 400 will be made to appear in line 418 as negative going amplitude modulated pulse position pulses which may again be inverted to positive pulses, as by an amplifier 330, Fig. 2.

Figure 5:
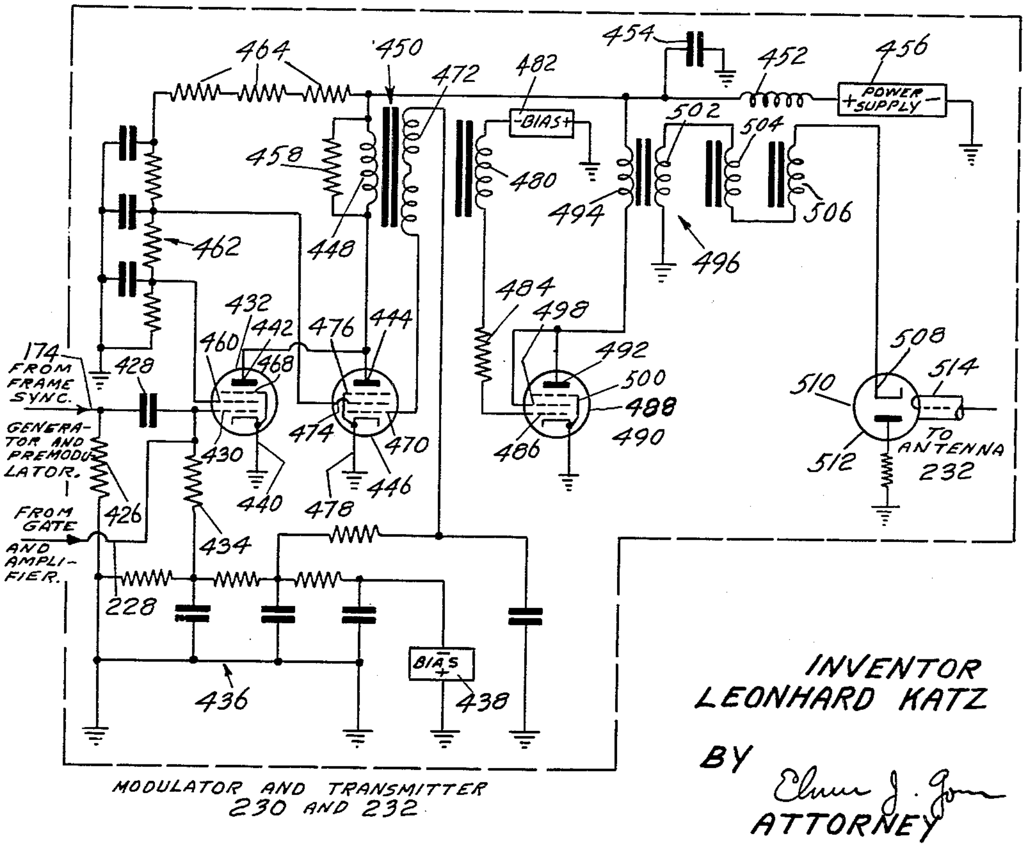
Fig. 5 is a circuit diagram of a suitable modulator and transmitter for use in the invention.

A suitable circuit for the modulator 230 and transmitter 232 is shown in Fig. 5. Pulses appearing through line 174 (Figs. 1 and 5) across resistance 426 are applied through a coupling capacitor 428 to control grid 430 of a pentode vacuum tube 432. A suitable bias is normally maintained at the control grid 430 by connecting it through a resistor 434 to a suitable point on a resistance capacitance filter 436 connected across a negative bias supply 438. The bias on control grid 430 is further controlled by connecting to it line 228 (Figs. 1 and 5) from the amplitude modulation channels 102 explained above with regard to Fig. 1. The pentode 432 also includes a cathode 440 directly connected to ground, an anode 442 connected to the anode 444 of another pentode vacuum tube 446, and through the primary winding 448 of a transformer 450 and a radio frequency choke 452, which is by-passed by a capacitor 454, to the positive terminal of a power supply 456 having its negative terminal grounded. The primary winding 448 is shunted by a damping resistor 458. The pentode 432 also has a screen grid 460 connected to an appropriate point on a resistance capacitance filter 462 connected, in turn, through the resistances 464 and the choke 452 across the power supply 456. Suppressor grid 468 is tied back to the cathode 440.

The outputs of the tubes 432 and 446 are connected in parallel with part of the output fed back to control grid 470 of the tube 446 through a secondary 472 of transformer 450. Screen grid 474 of tube 446 is connected to an appropriate point on the filter network 462 and the suppressor grid 476 is tied back to cathode 478 which is connected to ground.

The transformer 450 includes a tertiary winding 480 connected at one end to the negative terminal of a bias supply 482 having its positive terminal grounded, and at the other end, through a resistor 484, to control grid 486 of a third vacuum tube 488. The cathode 490 of said tube is grounded and anode 492 thereof is connected through primary winding 494 of a transformer 496 and choke 452 to the power supply 456. The screen grid 498 of said tube is tied to the anode 492, and the suppressor grid 500 is connected to cathode 490.

The transformer 496 includes a secondary winding 502, one end of which is grounded, and the other end of which is connected to a tertiary winding 504, which, in turn, is connected to another winding 506. The winding 506 is connected through a cathode 508 of a suitable microwave generator, such as a magnetron 510 of the type capable of being amplitude modulated, and preferably without distortion of its output voltage (see patent to Hall, Patent No. 2,473,794, issued 1949). Anode 512 of the magnetron 510 is connected to ground and its output may be applied to the antenna 234 (Fig. 1) by means of a pick-up loop and coaxial line 514.

The above circuit drives the magnetron cathode 508 highly negative with respect to anode 512, thereby exerting said magnetron into microwave oscillations. For a more complete understanding of the operation of the circuit of Fig. 5, reference is made to Fig. 11. At A in said figure, there is shown the sharp positive pulses 150 constituting the outputs of the premodulators 134 to 146, inclusive, and the frame sync generator 148 (Fig. 1) appearing at the grid 430 of the tube 432. The broken lines in this figure merely indicate that the pulses are repeated. Because of the bias at grid 430 being controlled through line 228, the effective amplitude of the pulses 150 varies in accordance with the information from the amplitude modulation channels 102. The pulses of A are inverted at the plate 442 of the tube 432 and are distorted, by reason of the connection of the damped primary winding 448 to said plate 442, to produce the negative pulses shown at B, which have a negative amplitude indicative of the bias on control grid 430 from line 228. The transformer 450 inverts these pulses and feeds to the grid 470 of the tube 446 the positive pulses shown at C. The plate output of the tube 446 is the same as the plate output of the tube 432 as shown at D. The last-named pulses are inverted by the transformer winding 480 which applies the same as positive spikes E to the grid 486 of the tube 488. At the plate of the tube 488 there appear the pulses F which are then greatly amplified by the transformer 496, as shown at G, for application to the cathode 508 of the magnetron 510. The amplitude of these amplified pulses is determined by the effective amplitude of the pulses of A as controlled by the bias at controlled grid 430 from line 228. There finally appear, as the output of the magnetron 335, the powerful pulses of radio frequency energy shown at H having amplitudes corresponding to the information in the appropriate channel of the amplitude modulation biasing grid 430 through line 228.

For circuit diagrams and detailed descriptions of suitable circuits in the pulse position channels 100, including the frame sync generator 148, reference is made to application of Vernon C. Westcott et al., concerning Telemetering Transmission Systems, Serial No. 31,096. Also, suitable circuits for the pulse position receiving apparatus 254 (Fig. 2) enclosed in dotted lines may be found in the above-mentioned application.

Figure 12:
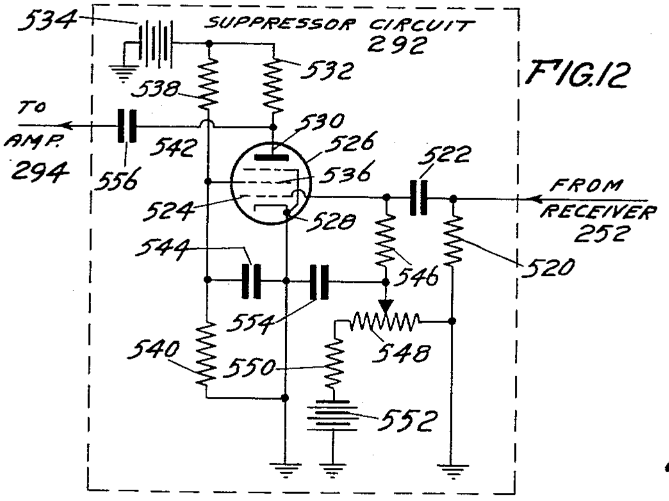
Fig. 12 is a suitable suppressor circuit for use in the receiving portion of the second embodiment of the invention.

A suitable circuit for the suppressor 292 is shown in Fig. 12. The output from the receiver 252 (Fig. 2) is limited by application across a grounded resistor 520 and through a coupling capacitor 522 to control grid 524 of a pentode vacuum tube 526. Cathode 528 of said tube is grounded, and anode 530 thereof is connected through a resistor 532 to the positive terminal of a power supply, such as battery 534, having its negative terminal grounded. Screen grid 536 of the tube 526 is connected through a resistor 538 to the power supply 534 and through a resistor 540 to ground. Suppressor grid 542 is tied back to the cathode. Resistors 538 and 540 are by-passed to ground by a capacitor 544. The control grid 524 is returned to ground through a resistor 546, a potentiometer 548, a second resistor 550 and a negative bias supply as battery 552, said bias supply, the resistor 550 and the effective portion of the potentiometer 548 being by-passed to ground by a capacitor 554.

The bias on tube 526 is maintained at such potential that said tube is normally beyond cut-off by an amount in excess of the amplitude of the noise applied thereto from the receiver 252 (Fig. 2), whereby only signal pulses having amplitudes greater than that of said noise are passed thereby.

The anode output of the tube 526 is coupled through a capacitor 556 to a conventional pulse amplifier 294 (Fig. 2). Thus the noise from output of receiver 252 is removed by tube 526 and the pulses passing through tube 526 are suitably amplified by the amplifier 294 and passed to line 296 (Fig. 1) for operation of the amplitude modulation channels 256, as hereinbefore described.

This completes the description of the first embodiment of the invention wherein the amount of information conveyed by a pulse position telemetering system is increased by varying the amplitude of the pulse position pulses in accordance with the additional information.

In a second embodiment the amount of information conveyed is increased by varying the width of pulse position pulses. This second embodiment is produced at the transmitting side by replacing the apparatus enclosed in broken lines 560 in Fig. 1 by the apparatus shown in the partly schematic and partly block diagram enclosed by broken lines 562 in Fig. 6. The receiving end of the second embodiment is provided by inserting at point 564 in the line between receiver 252 and suppressor 258 a differentiating and clipping circuit shown in Fig. 8 to be hereinafter described.

Figures 6, 7:
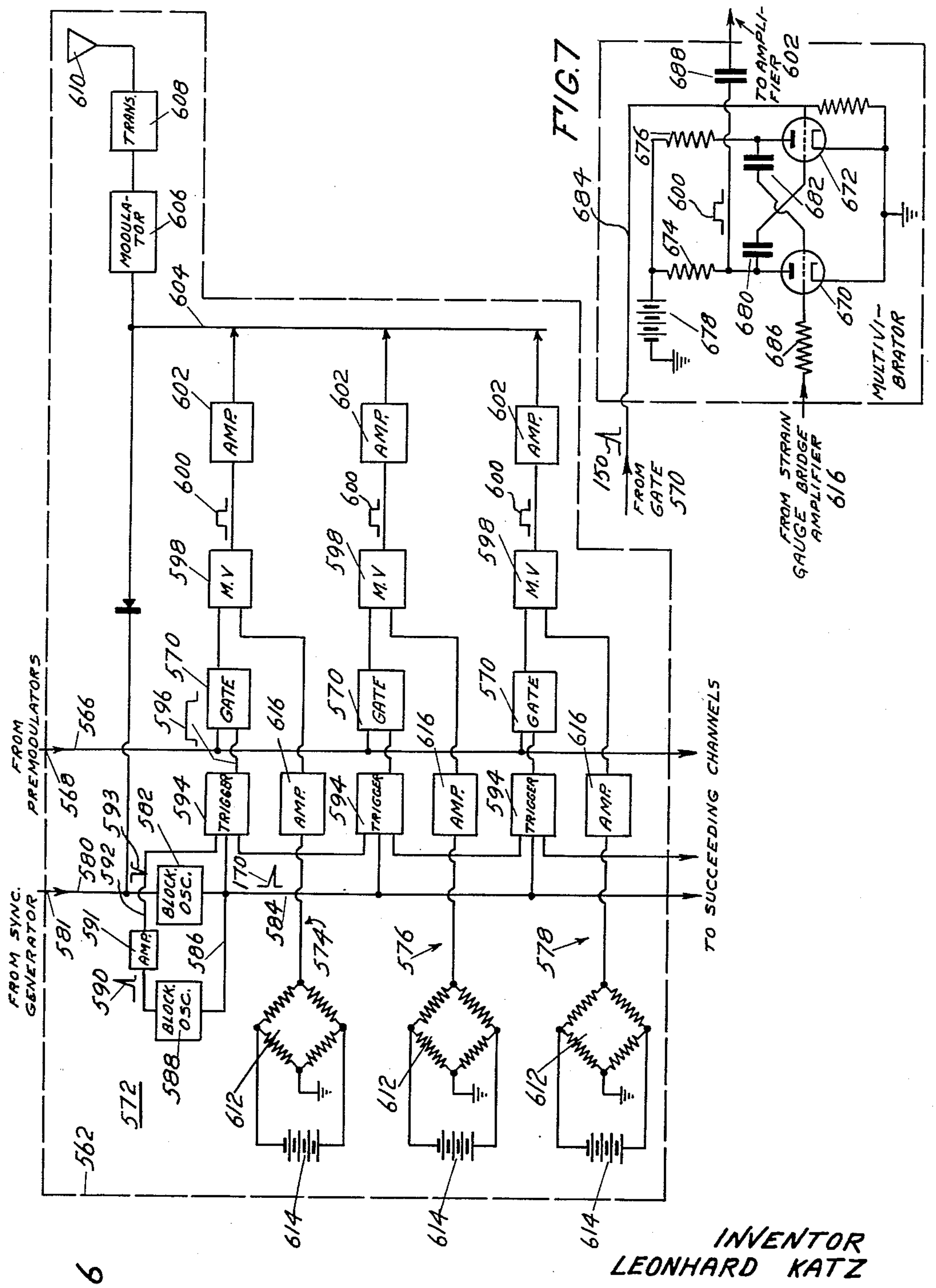
Fig. 6 is a partially schematic and partially block diagram of a portion of a transmitting system assembled in accordance with a second embodiment of the invention.
Fig. 7 is a circuit diagram of a suitable monostable multivibrator circuit for use in Fig. 6.

Referring first to the transmitting side of the system in the second embodiment, the pulse position pulses from the pulse position channels 100 are made to appear in line 566, Fig. 6, which is connected at point 568 to line 174 (Fig. 1) from the premodulator. The pulse position pulses 150 thereby appear through line 566 at gates 570 simultaneously in each of the pulse width modulation channels 572. The gates 570 may be similar to the gate 208 described and illustrated with regard to Fig. 4. In Fig. 6, only three pulse width modulation channels 574, 576, 578 are shown for purposes of illustration. However, a smaller or greater number of channels may be used. In the present embodiment, there are preferably seven channels, the additional four (not shown) being comprised of similar components added in a manner similar to that of the channels 574, 576 and 578 illustrated in Fig. 6.

Frame sync pulses 170 and 172 appear in line 580 from the line 184 which is connected to line 580 at point 581. The frame sync pulses 172 and 170 thereby appear at blocking oscillator 582, which may be similar to the blocking oscillator 186 Fig. 1, and having a time constant such that only the first sync pulse 170 will appear in lines 584 and 586 from the output of blocking oscillator 582. Every eighth pulse 170 representing every eighth frame of channels 100 appearing in line 586 at blocking oscillator 588, which may be similar to the blocking oscillator 192, is made to appear as a pulse 590 which is inverted by an amplifier 591 to a negative pulse 593 in line 592. The pulse 593 in line 592 appears at trigger circuit 594 in channel 574. The trigger circuit 594 may be similar to the trigger circuit 204 (Fig. 1) and is thereby triggered to the "on" position causing a gating pulse 596 at gate 570 in channel 574. The gate 570 in channel 574 is thus open during the gating pulse 596 thereby permitting the pulse position pulses 150 from line 566 to appear through gate 570 at a monostable multivibrator circuit 598. Each of the pulses 150 appearing at a multivibrator 589 triggers the multivibrator so as to cause it to emit a positive pulse 600 whose width is controlled as will hereinafter be described and which is amplified to a suitable level by an amplifier 602 and made to appear through line 604 at modulator 606, which may be similar to the modulator 230, Fig. 1. These pulse width pulses energize a suitable transmitter 608, which may be similar to the transmitter 232, and are radiated as radio energy from antenna 610. It should be noted that the leading edge of each pulse 600 coincides with the position of the corresponding pulse 150.

The monostable multivibrator 598 is arranged, as will be described with regard to Fig. 7, so that a potential signal from a suitable information pick-up circuit, such as a strain gauge bridge 612 having a power source such as battery 614, and amplified to a suitable level by an amplifier 616 and applied to the multivibrator 598, controls the width of the pulse 600. The width of pulse 600 thereby reflects the information pick-up by the strain gauge circuit 612. The multivibrator 598 has a time constant such that the greatest variation which may be caused by the pick-up circuit 612 and amplifier 616 will produce a pulse 600 having a width smaller than the shortest interval which may occur between two pulse position pulses. Thereby no overlap will occur between successive pulse width modulation pulses 600.

A trigger circuit 594 is provided in each of the channels 574, 576 and 578 connected together as described with regard to the trigger circuits in the channels 102 (Fig. 1) so as to successively index the channels at each pulse 170 to sample the information in each of channels 572 once for each eight frames from the pulse position channels 100.

Referring now to the receiving end of the second embodiment, the pulse width modulated pulses are picked up by antenna 250 and fed to receiver 252 from the output of which they appear at the differentiating and pulse clipping circuit inserted at point 564 (Fig. 2), which will be hereinafter described with reference to Fig. 8. In the circuit inserted at point 564, the front end or positive-going portion of each width modulated pulse is differentiated to form a sharp positive pulse which is made to appear at the suppressor circuit 258 to cause the rest of the apparatus 254 to operate as hereinbefore described. The back end or negative-going portion of each pulse width modulated pulse which produces a sharp negative pulse in the differentiating circuit is removed by a suitable electron tube so that it does not appear beyond the circuit 564. The sharp positive pulses appearing at the beginning of each pulse width modulated pulse thereby reproduce the pulse position information corresponding to the original pulse position pulses 150. The output of receiver 252 is also applied to suppressor 292 where noise is removed as hereinbefore described, and, after amplification to a suitable level by amplifier 294, the pulse width modulated pulses appear through the gate of the appropriate channel determined by the trigger circuit which is in the "on" position, as described with reference to the first embodiment. These pulse width modulated pulses appear through a suitable amplifier 330 at a meter 332 which, in this second embodiment, is preferably a high inertia voltmeter instead of the peak reading voltmeter referred to with regard to the first embodiment. The reading or deflection of the indicator on the high inertia voltmeter 332 will be determined by the average widths of the pulses in a particular frame appearing at the meter and may be indicated by a suitable indicator 334 and recorded by a suitable recorder 336 synchronized with the recorder 278, as described with reference to the first embodiment. In this manner, the pulse width information is successively obtained in each of the channels 304, 306 and 308 and the remaining four of the seven channels preferably used (not shown).

Figure 8:
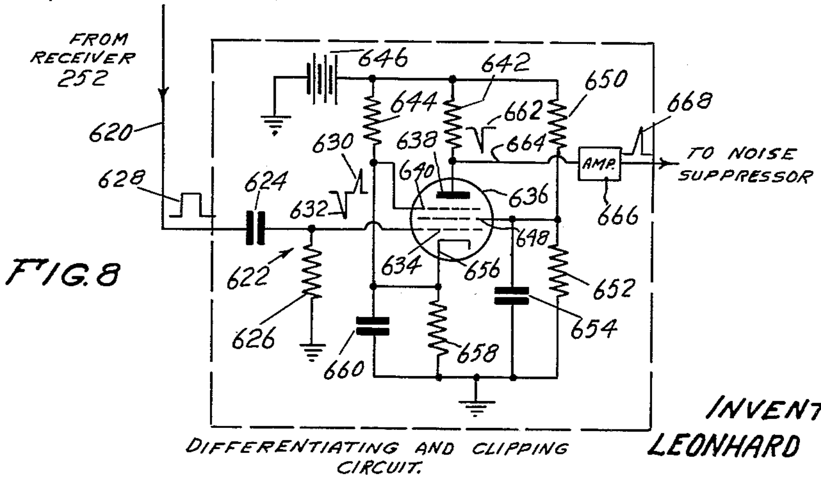
Fig. 8 is a circuit diagram of a suitable differentiating and clipping circuit for adapting the receiving system in Fig. 2 for operation with the transmitting system in the second embodiment of the invention.

A suitable differentiating and clipping circuit for use at point 564 is shown in Fig. 8. In this circuit, the output of receiver 252 is applied through line 620 to the differentiating circuit 622, which may consist of a capacitor 624 in line 620 and suitable resistance 626 connected from the capacitor 624 to ground. Thus a width modulated pulse 628 appearing in line 620 at capacitor 624 will be differentiated by circuit 622 so as to appear as a positive pulse 630 and a negative pulse 632 at control grid 634 of a pentode vacuum tube 636. The positive pulse 630 occurs at the leading or positive-going edge of pulse 628, and the negative pulse 632 appears at the trailing or negative-going edge of the pulse width modulated pulse 628.

The pentode 636 has its anode 638 and suppressor grid 640 connected through resistances 642 and 644, respectively, to the positive terminal of a power source, such as a battery 646 having its cathode connected to ground. Screen grid 648 is connected through resistance 650 to the power source 646 and through resistance 652 to ground. A shunting capacitance 654 is connected across the resistance 652. Cathode 656 and tube 636 are connected through resistance 658 and by-pass condenser 660 to ground. Tube 636 is biased so that the positive pulse 630 appearing at grid 634 will cause conduction of tube 636 and will thereby appear as a negative pulse 662 in line 664 leading from the anode 638 of the tube 636. The bias on tube 636 is such that the tube 636 is normally nonconductive. Therefore, the negative pulse 632 will not appear in line 664.

Since the positive pulse 624 appears as a negative pulse 662 in line 664 from the anode 638 of tube 636, it is applied to a suitable pulse amplifier 666 for inversion to a positive pulse 668 having a leading edge coinciding with the leading edge of pulse width modulated pulse 628. The output of amplifier 666 is applied to the suppressor circuit 258 for operation in conjunction with the rest of the pulse position apparatus 254 as explained above.

A suitable monostable multivibrator is shown in Fig. 7. Triodes 670 and 672 are connected through resistances 674 and 676, respectively, to the positive terminal of a power source as a battery 678 whose negative terminal is grounded. The plate of triode 670 is coupled through capacitor 680 to the grid of triode 672 and the plate of triode 672 is coupled through capacitor 682 to the grid of triode 670. Triode 670 is normally conductive and triode 672 nonconductive. When a positive pulse position pulse 150 appears from the gate 570 (Fig. 6) through line 684 at the grid of triode 672, the triode 672 becomes conductive thereby extinguishing triode 672. The triode 672 remains nonconductive for a period determined by the bias voltage from the strain gauge bridge amplifier 616 (Fig. 6) applied through resistance 686 at the grid of triode 670. The result is a positive pulse 600 appearing from the anode circuit of triode 670 through a coupling capacitor 688 in the output line to the amplifier 602 (Fig. 6). Other circuits in this second embodiment may be similar to the circuit described with regard to the first embodiment.

This invention is not limited to the particular details of construction and processes described as equivalents will suggest themselves to those skilled in the art. It is accordingly desired that the appended claims be given a broad interpretation commensurate with the scope of the invention within the art.

What is claimed is:

1. A radio transmitter comprising: a first means, generating electrical oscillations of relatively high frequency; a second means, generating electrical oscillations of relatively low frequency; a third means, receptive of said last-named electrical oscillations, cyclically deriving therefrom a plurality of signals of different relative phases; a fourth means, receptive of said last-named signals, cyclically deriving from each of said last-named signals a plurality of voltage pulses spaced from each other as a function of the magnitude of externally generated intelligence; a fifth means, synchronized with one of the signals from said third means, cyclically deriving from each of said last-named signals a plurality of modulating pulses each of which has a duration equal to a cycle of said electrical oscillations of relatively low frequency and an amplitude which is a function of additional externally generated intelligence; a sixth means, receptive of said voltage and modulating pulses, successively impressing predetermined modulating characteristics, respectively, upon each cycle of said voltage pulses in accordance with said additional externally generated intelligence; and a seventh means, receptive of the output of said sixth means, coupling said output to said first means and thereby plurally modulate the latter.

2. A radio transmitter comprising: a first means, generating electrical oscillations of relatively high frequency; a second means, generating electrical oscillations of relatively low frequency; a third means, receptive of said last-named electrical oscillations, cyclically deriving therefrom a plurality of signals of different relative phases; a fourth means, receptive of said last-named signals, cyclically deriving from each of said last-named signals a plurality of voltage pulses spaced from each other as a function of the magnitude of externally generated intelligence; a fifth means, synchronized with one of the signals from said third means, cyclically deriving from each of said last-named signals a plurality of modulating pulses each of which has a duration equal to a cycle of said electrical oscillations of relatively low frequency and an amplitude which is a function of additional externally generated intelligence; said fifth means including a trigger pulse generator, a plurality of cascaded gating pulse generators coupled to said trigger pulse generator, and a plurality of gating circuits coupled, respectively, to said gating pulse generators for sequentially passing said additional externally generated intelligence; a sixth means, receptive of said voltage and modulating pulses, successively impressing predetermined modulating characteristics, respectively, upon each cycle of said voltage pulses in accordance with said additional externally generated intelligence; and a seventh means, receptive of the output of said sixth means, coupling said output to said first means and thereby plurally modulate the latter.

3. A radio transmitter comprising: a first means, generating electrical oscillations of relatively high frequency; a second means, generating electrical oscillations of relatively low frequency; a third means, receptive of said last-named electrical oscillations, cyclically deriving therefrom a plurality of signals of different relative phases; a fourth means, receptive of said last-named signals, cyclically deriving from each of said last-named signals a plurality of voltage pulses spaced from each other as a function of the magnitude of externally generated intelligence; a fifth means, synchronized with one of the signals from said third means, cyclically deriving from each of said last-named signals a plurality of modulating pulses each of which has a duration equal to a cycle of said electrical oscillations of relatively low frequency and an amplitude which is a function of additional externally generated intelligence; said fifth means including a monostable oscillator having a time constant which is an integral multiple of the time of one cycle of said electrical oscillations of relatively low frequency, cascaded gating pulse generators, corresponding in number to one less than said integral multiple, coupled to said blocking oscillator, and gating circuits, corresponding in number and coupled, respectively, to said gating pulse generators, sequentially passing said additional externally generated intelligence; a sixth means, receptive of said voltage and modulating pulses, successively impressing predetermined modulating characteristics, respectively, upon each cycle of said voltage pulses in accordance with said additional externally generated intelligence; and a seventh means, receptive of the output of said sixth means, coupling said output to said first means and thereby plurally modulate the latter.

References Cited in the file of this patent

UNITED STATES PATENTS

| | | |
|---|---|---|
| 1,702,470 | Falknor | Feb. 19, 1929 |
| 2,427,500 | Houghton | Sept. 16, 1947 |
| 2,428,118 | Labin et al. | Sept. 30, 1947 |
| 2,441,969 | Lehmann | May 25, 1948 |
| 2,462,874 | Labin et al. | Mar. 1, 1949 |
| 2,474,244 | Greig | June 28, 1949 |
| 2,486,491 | Meacham | Nov. 1, 1949 |
| 2,498,678 | Greig | Feb. 28, 1950 |
| 2,543,736 | Trevor | Feb. 27, 1951 |

OTHER REFERENCES

Deloraine, Abstract of application Serial No. 3,234, published July 11, 1950, 636 O. G. 666.